W. BAKER.
RIVETING MACHINE.
APPLICATION FILED JULY 7, 1908.

971,483.

Patented Sept. 27, 1910.
7 SHEETS—SHEET 5.

Witnesses
F. C. Gibson
C. Bradway

Inventor
Walter Baker
By Victor J. Evans
Attorney

W. BAKER.
RIVETING MACHINE.
APPLICATION FILED JULY 7, 1908.

971,483.

Patented Sept. 27, 1910.
7 SHEETS—SHEET 6.

Witnesses
F. C. Gibson.
C. Bradway.

Inventor
Walter Baker.

By Victor J. Evans
Attorney

W. BAKER.
RIVETING MACHINE.
APPLICATION FILED JULY 7, 1908.

971,483.

Patented Sept. 27, 1910.
7 SHEETS—SHEET 7.

Inventor
Walter Baker
By Victor J. Evans
Attorney

Witnesses
F. L. Gibson
C. Bradway

UNITED STATES PATENT OFFICE.

WALTER BAKER, OF WAPATO, WASHINGTON.

RIVETING-MACHINE.

971,483.  Specification of Letters Patent.  Patented Sept. 27, 1910.

Application filed July 7, 1908. Serial No. 442,313.

*To all whom it may concern:*

Be it known that I, WALTER BAKER, a citizen of the United States, residing at Wapato, in the county of Yakima and State of Washington, have invented new and useful Improvements in Riveting-Machines, of which the following is a specification.

This invention relates to riveting machines for fastening pieces of leather or other materials together by means of rivets, and relates more particularly to a machine in which the various operations are carried on automatically so that the attendant is required simply to place the pieces of material in proper position for riveting.

The invention has for one of its objects to improve and simplify the construction and operation of devices of this character so as to be comparatively easy and inexpensive to manufacture, thoroughly reliable and effective in use, and of durable and substantial design.

A further object of the invention is the provision of a machine including, in its organization, and construction, coöperatively related devices whereby the rivets and burs are fed separately and placed in riveting position, the parts to be fastened punched, the burs centered with regard to the punched holes in the material, the shanks of the rivets cut to the proper length, and the rivets upset over the burs so as to thereby secure the parts firmly together without the necessity of any manual labor except the proper positioning of the parts to be riveted.

An additional object of the invention is the employment of a separating device whereby the burs and rivets can be separated and supplied to separate feed tubes, said device including a reservoir into which the burs and rivets are emptied in mixed condition as they are put up in boxes for the market.

A still further object of the invention is to provide means at the discharge end of the feed tubes or chutes for placing the rivets and burs in riveting position.

Another object is to provide a punching device with which is associated a depressor or holder-on having the two-fold function of holding the punched material in position on the work table as the punch is withdrawn and of holding the rivet in during the upsetting operation.

A further object is the employment of a pair of clipping jaws or cutters arranged to cut the superfluous length of the shank of the rivet, the cutters being set into operation after the rivet and bur have been applied to the work.

A further object is the employment of a single master wheel operating in connection with suitable mechanism for actuating the rivet and bur-feeding devices, the punch, rivet-feeding cutters and hammer.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one of the embodiments of the invention, Fig. 18ᵃ is a section on line 18ᵃ—18ᵃ, Fig. 18.

Similar reference characters are employed to designate corresponding parts throughout the several views.

Referring to the drawings, A designates the supporting frame of the machine including a pedestal 1 from which extends a horizontally-extending work table 2, and rising from one end of the table is the body 3 that is formed with a neck or horizontal portion 4 disposed over the work table and carrying a head 5. Supported above the frame is a rivet and bur-separating mechanism B.

Figure 3:
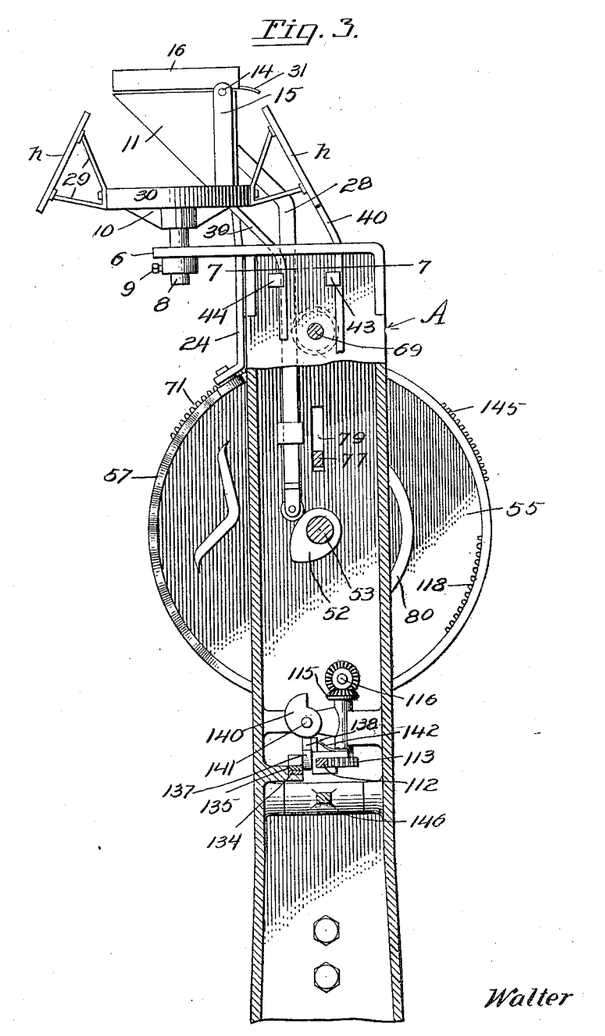
Fig. 3 is a sectional view on line 3—3, Fig. 1.
Figure 11:
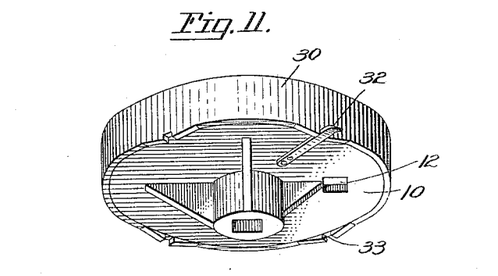
Fig. 11 is a bottom perspective view of the supporting disk for the rivet and bur-separating device.
Figures 15, 16, 18:
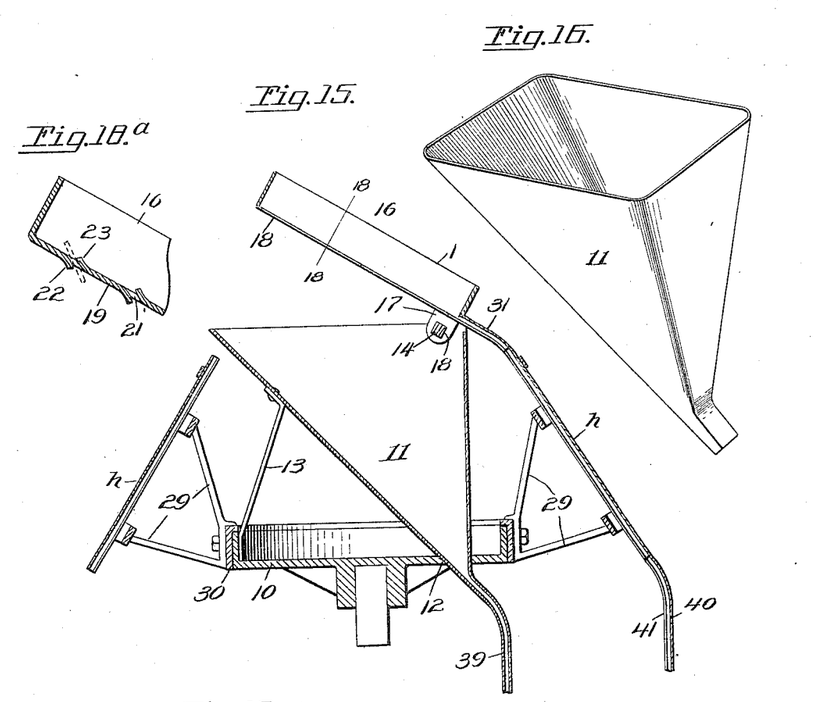
Fig. 15 is an enlarged vertical section of the bur and rivet-separating mechanism.
Fig. 16 is a perspective view of the bur-receiving hopper arranged at the top of the bur-feeding chute.
Fig. 18 is a sectional view on the line 18—18, Fig. 15.
Figure 17:
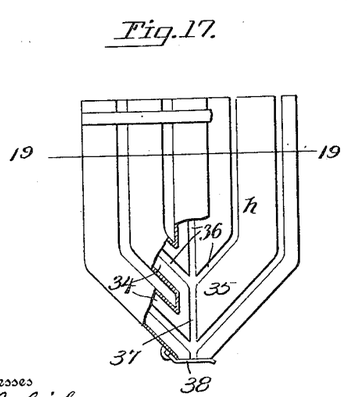
Fig. 17 is a plan view with portions broken away of one of the rivet-holders.
Figure 18:
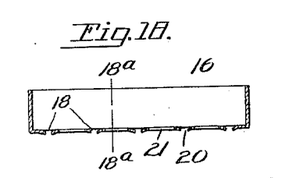
Figure 19:
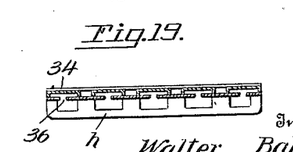
Fig. 19 is a section on line 19—19, Fig. 17.
Figure 20:
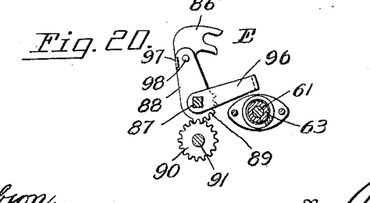
Fig. 20 is a section on line 20—20, Fig. 5.
Figure 22:
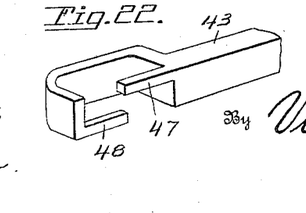
Fig. 22 is a perspective view of one of the feeding devices for the burs and rivets.

As shown in Fig. 3, an arm 6 projects rearwardly from the upper extremity of the frame A, and extending vertically through the arm is mounted a stem 8 which is adjustably secured in place by a clamping screw 9, and on the upper end of the stem is fixed a disk 10 for supporting the parts of the separating device B. Arranged over the disk is a funnel-shaped hopper 11 having its mouth portion projecting through an opening 12 in the disk, as shown in Fig. 15, and the hopper is held rigidly in position by a brace 13. Extending horizontally across the top of the hopper is a rock-shaft 14 mounted in arms 15 rising from the supporting disk 10. Arranged over the hopper 11 is a separator 16 in the form of a pan into which the rivets and burs are promiscuously dumped from the usual boxes in which they are put up for the trade, and depending from the front of the separator are lugs 17 having squared apertures 18 for receiving the shaft 14 which is of square cross-section. The shaft 14 is mounted in the arms 15 to have a longitudinal as well as a rocking movement so as to permit the separator to be vibrated to facilitate the separating of the burs from the rivets. The bottom 19 of the separator is provided with parallel slots 20, as clearly shown in Figs. 15 and 18, and the edges of the slots are bent downwardly so as to facilitate the entrance of the shanks of the rivets, and the portions of the bottom between the slots are provided with transversely-extending slots 21 that have their opposite edges bent inwardly and outwardly as indicated at 22 and 23, Fig. 18$^a$, so as to permit the burs to drop out of the separator when the latter is tilted, the burs passing freely out of the slots 21 as indicated by dotted lines in Fig. 18$^a$. The shaking movement of the separator is produced by a lever 24 fulcrumed at 25 on the frame A and having its upper end engaged between pins 26 on the shaft 14. The separator is periodically tilted so as to permit the burs and rivets to discharge from the separator, this being accomplished by a crank arm 27 to which is hingedly connected a reciprocatory rod 28. As the hopper 11 is disposed under the separator, the burs will drop into the former and the rivets are delivered to a holder $h$. In the present instance, several holders $h$ are employed which are preferably of different sizes so that they can be used for different-sized rivets and the holders are supported on brackets 29 secured to a ring 30 fitted around the disk to turn thereon so as to bring any desired holder in coöperative relation with the spouts 31 of the separator 16. The ring 30 is locked in position by a spring latch 32, Fig. 11, fixed on the bottom of the disk 10 and adapted to engage in one of the notches 33 formed in the bottom edge of the ring 30, thereby retaining the holder $h$ in operative relation with the separator for receiving the rivets therefrom. Each holder consists of a plurality of parallel conduits 34 that run together at their lower ends into a common passage and each conduit has a slot 36 in its bottom that merge into a common discharge slot 37, the said slots being arranged to receive the shanks of the rivets, while the conduits 34 receive the heads of the rivets. The conduits 34 are disposed in alinement with the spouts 31 so that the rivets can flow freely from the separator to the holder $h$, and if desired, the holder may be provided with a valve 38, Fig. 17, for retaining the rivets in the holder. Leading from the funnel 11 and holder $h$ are feed tubes or chutes 39 and 40 respectively, that have their lower ends curved and disposed horizontally over the work table 2, the chute 40 being provided with a longitudinal slot 41 for accommodating the shanks of the rivets.

Figure 1:
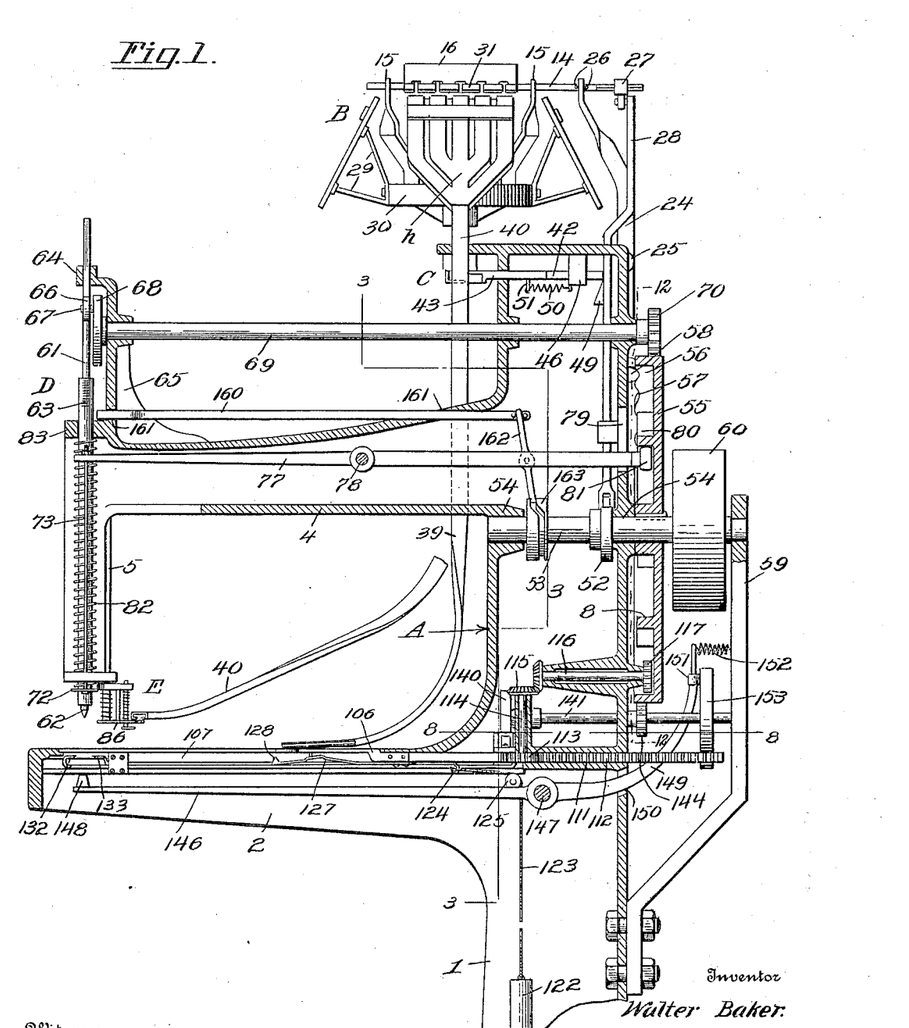
Figure 1 is a vertical section of the machine showing certain of the parts in elevation.
Figure 2:
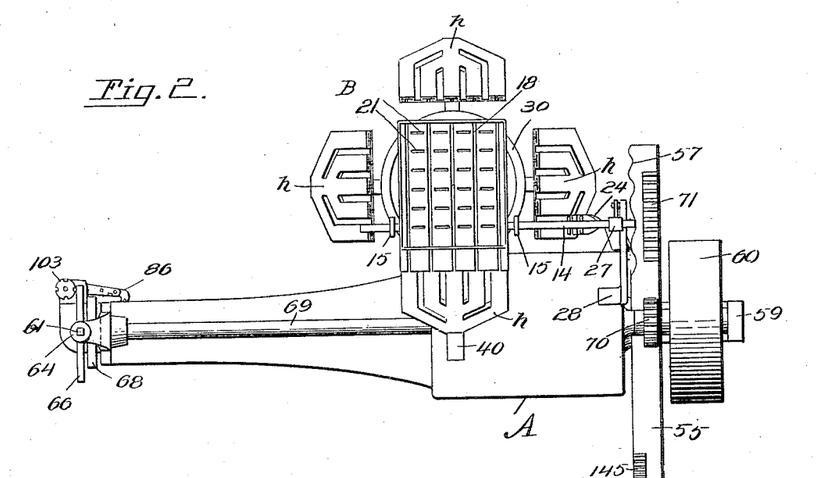
Fig. 2 is a plan view thereof.
Figure 7:
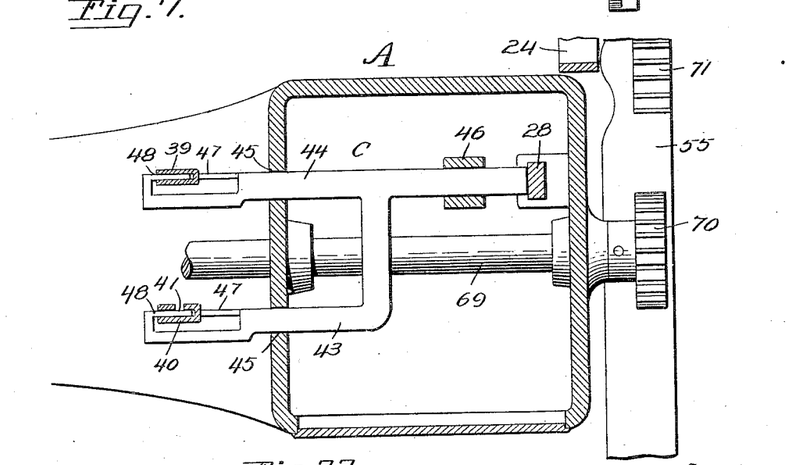
Fig. 7 is an enlarged sectional view on line 7—7, Fig. 3.

The feed of the rivets and burs is controlled by a feeding device C, Figs. 1, 3 and 7. This device comprises a horizontally-movable element 42 disposed in the upper end of the frame and provided with arms 43 and 44 that slidably bear in openings 45 in the frame, which openings coöperate with a bearing 46 to slidably support the element 42. The arms 43 and 44 are each provided with fingers 47 that pass through openings 48 in the walls of the feed chutes, the fingers of each arm being vertically spaced one from the other a distance equal to the diameter of a bur or head of a rivet and being off-set horizontally one from the other so that by the reciprocation of the element 42, the fingers will co-act to permit one rivet and bur to feed at a time. The element 42 of the feeding device is actuated in one direction by a cam 49 on the reciprocatory rod 28 and returned by a spring 50 connected with the bearing 46 and with the lug 51 on the said element. The rod 28 is actuated by a cam 52 arranged on the driving shaft 53 and mounted in bearings 54 of the frame A, and the shaker lever 24 is operated by a master wheel 55 located on the crank shaft outside of the frame A, the wheel having a peripheral flange 56 that is provided with an undulatory portion 57 on which rides a roller 58 on the lower end of the lever 24, whereby the said lever is rocked. The outer end of the shaft 53 is supported by a bracket 59 on the frame A and between the bracket and wheel 55 is a driving pulley 60 that receives power from any suitable source.

Figures 4, 5:
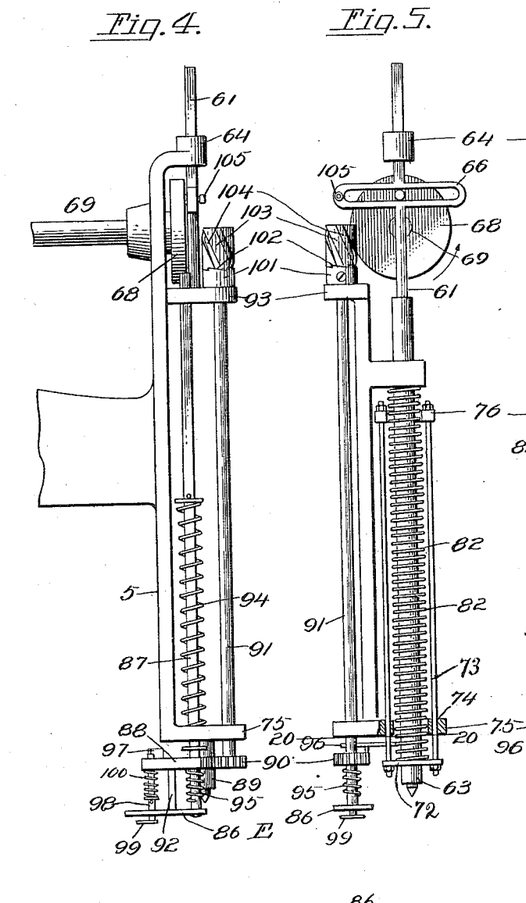
Figs. 4, 5 and 6 are respectively, rear, side and front views of the head portion of the machine showing the punching device, holder-on, and rivet-placing device.
Figure 6:
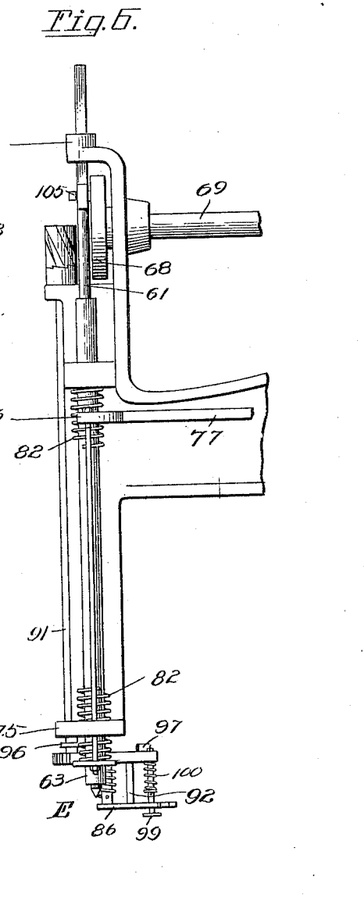
Figure 12:
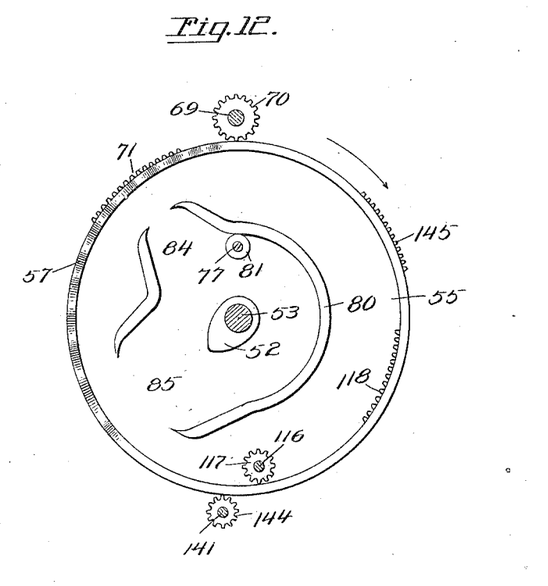
Fig. 12 is a vertical section on line 12—12, Fig. 1.

On the head 5 of the frame is a punching mechanism D which includes a reciprocatory rod 61 that has its lower end 62 formed into a point for piercing the work as it rests on the upper face of the table 2. The rod passes through a sleeve 63 carried by the head 5 and slides in a bearing 64 on the bracket 65 rising from the tubular portion or neck 4 of the frame. Between the upper end of the sleeve and bearing 64, the punch 61 is formed with a yoke 66 into which engages a crank pin 67 arranged on the crank disk 68, which disk is secured to a rotary shaft 69 mounted at opposite ends in the bracket 65 and frame A. The end of the shaft opposite from that having the crank disk 68, is equipped with a pinion 70 arranged to mesh with the gear teeth 71 on the periphery of the master wheel 5, the number of teeth 71 being such that the punch will be actuated once during a portion only of each revolution of the wheel. The sleeve 63 forms a holder-on for the rivets, whereby the latter are held in place during the up-setting operation and they further serve to release the punch from the material after the latter is pierced. For this purpose, the sleeve 63 is depressed at the proper interval by suitable means operated by the wheel 55. Fixed on the sleeve is a crosspiece 72 to which are connected the lower ends of the rods 73 disposed at opposite sides of the sleeve, as clearly shown in Fig. 5, and passing through apertures 74 in the lug 75 on the lower end of the head, the upper ends of the rods being connected with a bifurcated end 76 of the lever 77. The lever 77 is disposed in the neck 4 of the frame and fulcrumed at 78 with the extremity projecting through a vertical slot 79 in the body of the frame to be in coöperative relation with a flange 80 on the wheel 55 forming a flange, there being a roller 81 on the lever to ride over the cam without undue friction. Surrounding the sleeve 63 is a helical compression spring 82 that bears at its lower end on the top side of the cross head 72, while its upper end bears on the abutment 83 on the head of the frame, so as to urge the sleeve downwardly and maintain the roller 81 in contact with the cam 80. As shown in Fig. 12, the cam 80 is open at 84 and 85, so that as the roller 81 follows the cam at the offset portion 84, the sleeve 63 will be depressed by the expansion of the spring 82, and as the roller passes out of this offset portion 84 of the cam, the sleeve 63 will be raised. This movement of the sleeve is related to the movement of the punch 62 so that the lower end of the sleeve will bear on the work at the time the punch is withdrawn from the latter for thus readily extracting the punch from the work. When the roller-carrying end of the lever 77 enters the offset portion 85 which is wider than the offset portion 84 of the cam, the sleeve 63 will be maintained in contact with the head of the rivet which in the meantime has been placed in the work, thus serving as a holder-on during the up-setting or riveting operation. The range of movement of the lever 77 is such that the roller-carrying end thereof will not pass out of the offset portion 84 on the cam wheel. When the offset 85 is reached the spring 82 will expand to thereby tilt the lever 77, but this tilting movement is limited by the engagement of the plate or member 72 into engagement with the work and the lever remains in tilted position until the opposite wall of the offset 85 strikes the roller of the lever to thereby return the latter against the tension of the spring 82.

The rivet-feeding chute 40 terminates adjacent the lower end of the head 5 and carried by the said head is the rivet-placing device E whereby the rivets are successively taken from the discharge end of the chute and properly positioned with respect to the work. The device E consists of an arm 86 mounted to swing in a horizontal plane on the lower end of a non-rotatable rod 87, the arm having its outer extremity bifurcated so as to receive the shank of the lowermost rivet in the chute 40, while the head rests on the top surface of the arm, while the latter transports it from the chute to the riveting position. Disposed above the rivet-carrying arm and mounted to swing on the rod 87 is a lever 88 that is provided with teeth 89 with which meshes a pinion 90 on the lower end of the shaft 91, the lever being rigidly secured to the rivet-carrying arm by a connecting piece 92. The rod 87 and shaft 91 are mounted in the lugs 75 and 93 of the head 5, and as the shaft 91 rotates, the arm 86 with its rivet is carried from the discharge end of the chute 40 to a point under the sleeve 63 so that as the latter is depressed, the arm 86 will also be depressed for thus placing the rivet in the hole previously made by the punch 62. The rod 87 is mounted to move longitudinally for permitting the arm 86 to be depressed by the sleeve 63, and to return the rod 87, the spring 94 is provided. Normally, the rivet-carrying arm 86 is disposed with its free extremity adjacent the discharge end of the chute 40 so as to be in the position to receive a rivet, and when the arm is swung around to position under the sleeve 63, a torsional spring 95 fixed at one end on the arm 88 and at the opposite end on the rod 87, is placed under tension so as to return the rivet-carrying arm 86 at the proper moment. During the period that the rivet-carrying arm 86 is disposed under the sleeve and is depressed by the latter, the arm is prevented from returning under the tension of the spring 95 by a spring latch 96 which is arranged to engage a catch 97 on the arm 88. When the sleeve 63 has reached a point where it forces the shank of the rivet in the hole punched in the work, the latch 96 is automatically released for the purpose of permitting the rivet-carrying arm to move out of the way and return to its normal position so as to permit the sleeve to force the rivet home in the work and hold it in position for riveting. The spring latch is automatically released by a vertically-movable releaser 98 mounted on the arms 86 and 88 and provided with a foot 99 which is adapted to bear on the work resting on the work table when the parts are moved downwardly by the sleeve 63, the releaser 98 being urged downwardly by a compression spring 100 which permits the releaser to yield when the foot comes into contact with the work so that the upper end of the releaser will engage under the spring latch 96 and release the latter from the catch 97.

The shaft 91 which swings the rivet-carrying arm from the feed-chute 40 to the delivering position under the sleeve 63 is rotated by a ratchet device consisting of a head 101 on the upper end of the shaft and provided with ratchet teeth 102 with which engage corresponding teeth on the sleeve 103, the said sleeve being rotatable mounted on the upper end of the shaft and provided with spiral grooves 104 in one of which works a roller 105 provided on the yoke 66. By this means, the reciprocatory movement of the rod 61 causes the pin 105 to engage in one of the grooves 104 of the sleeve 103 to move the latter a partial turn so that the ratchet teeth will impart a partial turn to the shaft 91, the ratchet being so shaped that when the yoke 66 moves downwardly, the element 103 will turn independently on the shaft 91 and will, upon the return or upward movement of the yoke, cause the shaft 91 to turn and thereby move the rivet-carrying arm 86 to a position under the sleeve 63, when the latter has returned to its raised position. When the sleeve is again depressed by the operating lever 77 entering in the offset portion 85 of the cam 80, Fig. 12, the rivet-carrying arm will be depressed with the sleeve, as hereinbefore described.

Figures 8, 9, 10, 13, 14, 21:
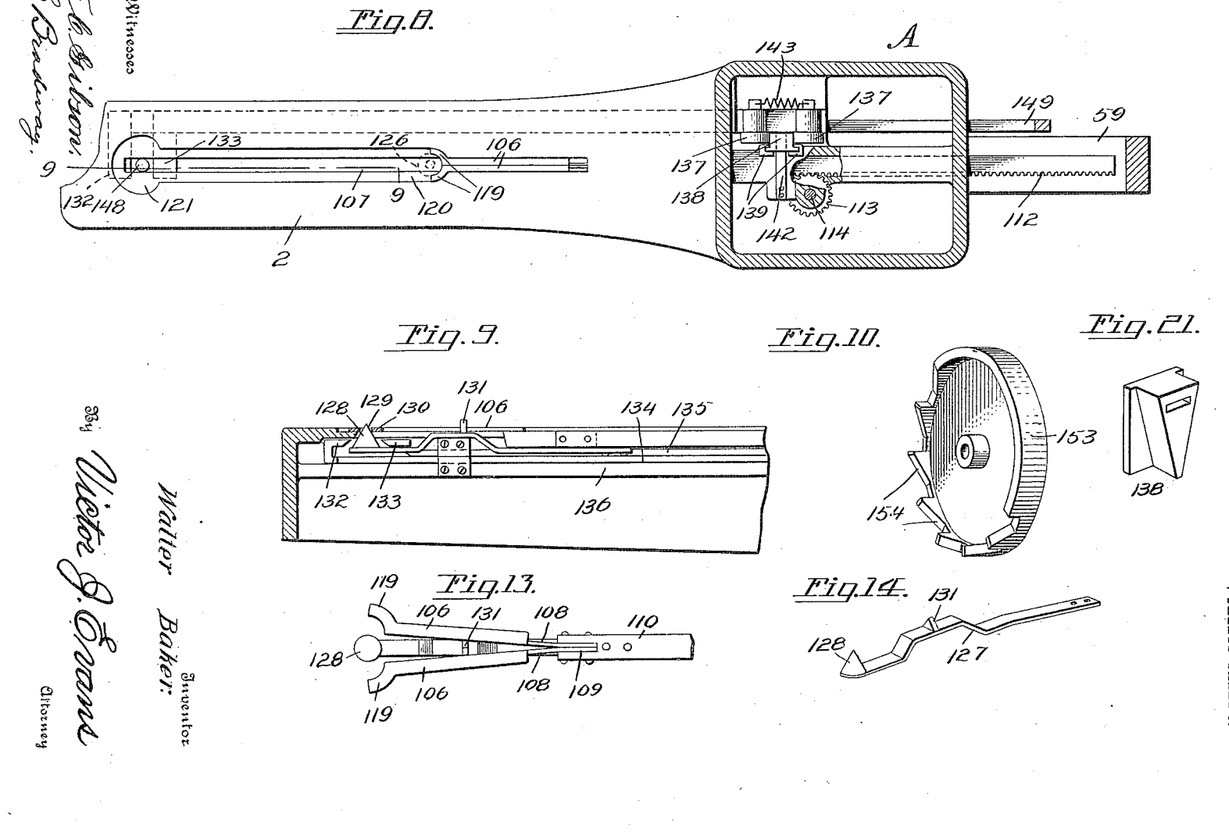
Fig. 8 is a horizontal view on line 8—8, Fig. 1.
Fig. 9 is a vertical section on line 9—9, Fig. 8.
Fig. 10 is a perspective view of the hammer-actuating wheel.
Fig. 13 is a plan view of the bur-placing means.
Fig. 14 is a perspective view of the means for centering the bur after being positioned by the bur-placer so as to insure the insertion of the shank of the rivet.
Fig. 21 is a perspective view of the wedge for operating the cutters.

The bur-placing device consists of a pair of jaws 106 arranged to move in a longitudinal slot 107 of the work table 2, Figs. 1, 8, 9 and 13, the jaws being provided with spring extremities 108 which are set in a slot 109 riveted in place in a bar 110, said bar being slidably mounted in a bearing 111 of the frame A, as shown in Figs. 1 and 8, and provided with rack teeth 112 with which meshes a pinion 113. This pinion is secured to a shaft 114 which is driven through a miter gearing 115 by the shaft 116, there being in the latter shaft a pinion 117 arranged to mesh with the internal teeth 118 on the flange 56 of the master wheel 55. The free ends of the jaws 106 are formed into arcuate lips 119 which slide on ledges 120 provided in the work table 2 at opposite sides of the slot 107. At the outer end of the slot, the work table is provided with an enlarged recess 121 which permits the jaws to spring laterally when the bur-placing device has reached the end of its movement so as to thereby release the bur. The internal gear teeth 118 are so arranged that the rack bar 110 is fed forwardly to place the bur under the work immediately after the latter has been pierced by the punch 62.
At the end of the forward movement of the rack bar of the bur-placing device, the gear teeth 118 disengage from the pinion 117 and thereupon the rack bar is retracted by a weight 122, Fig. 1, that is connected by a cord 123 to the hook 124 on the bottom of the rack bar, the cord passing over a guide pulley 125. When the rack bar is fully retracted, the lips 119 of the jaw members 106 are disposed directly under the discharge end of the chute 39 which terminates directly over the work table. The bur passes by gravity down the chute 39 and drops into the slot 107 and rests on the ledges 120 directly in front of the jaws, as shown by dotted lines at 126, Fig. 8. The apertures of the burs are not always in the center so that it is necessary to employ a centering means for the purpose of positioning the bur directly under the aperture in the work so that the entrance of the shank of the rivet in the aperture of the bur will be insured. For this purpose, a leaf spring 127 is secured to the jaw-carrying end of the rack bar 110, and mounted on the spring is a cone 128 which is adapted to enter the aperture 129 of the bur 130, Fig. 9, and thus center the latter under the work. This centering cone is normally held depressed by means of a wedge-shaped cam 131 rising from the spring at a point intermediate its ends so as to be engaged between the jaws 106. When the jaws open for releasing the bur, the spring 127 is permitted to rise so that the cone 128 will center the bur and upon the return stroke of the bur-placing device, the jaw members 106 will be moved toward each other by the walls of the slot 107 and thus engage the wedge-shaped cam 131 so as to depress the cone 128 out of the aperture of the bur and thus leave the latter in centered position.

In case the shanks of the rivets are too long for efficient riveting, it may be desirable to employ trimming means, and to this end a pair of cutters 132 and 133 are arranged under the work table at a point where the shank of the rivet enters the slot 107. The cutters are secured respectively to sliding bars 134 and 135 which are supported on a horizontal rib 136 formed on the work table, the cutter bar 135 being slidably mounted on the other cutter bar. The inner end of the bars 134 and 135 are provided with rollers 137 between which works a wedge 138 for simultaneously moving the bars in opposite direction so as to bring the cutters toward each other and for cutting off the extremity of the rivet. The wedge, as shown in Fig. 8, is slidably mounted in guides 139 mounted on the frame of the machine and is depressed by a cam 140 secured to the secondary shaft 141, and the wedge is equipped with a spring 142 for raising it. As the wedge 138 is retracted, the cutters are separated by a spring 143 connected with the inner ends of the bars 134 and 135. The shaft 141 on which the wedge-actuating cam 140 is mounted, is provided with a pinion 144 disposed under the wheel 55 and located in the path of the external gear teeth 145, the said teeth being arranged out of alinement with the teeth 71 in order that the pinion 70 of the punch-operating shaft will be actuated only by the latter teeth. The teeth 145 are arranged so as to be brought into mesh with the pinion 144 for operating the rivet-cutting mechanism after the rivet has been inserted in the work and bur and just prior to the up-setting operation by the hammer. After the rivet shank has been thus trimmed, the rivet is up-set by a hammer 146 disposed under the work table and fulcrumed at 147 on the frame A, the free extremity of the hammer being provided with a head 148 proportioned to work between the separated cutters 132 and 133 for up-setting the rivet while the sleeve 63 is held depressed on the head of the rivet. The hammer is formed with an arm 149 that projects through a slot 150 in the frame A and on the extremity of the arm is a roller 151 held by a spring 152 against the wheel 153. This wheel is keyed to the shaft 141 and is formed with a plurality of notches 154, as shown in Fig. 10, so that as the wheel rotates, the roller 151 rides over the notches, and thus causes the hammer to be given a succession of rapid blows. This actuation of the hammer takes place while the sleeve 63 is held depressed by the spring 82, while the inner end of the actuating lever 77 is in the offset portion 85 of the cam 80.

The operation of the machine may be briefly described as follows. After the rivets and burs have been placed in the separating device, the machine is set into operation by applying power to the pulley 60 so that as the shaft 53 rotates, the wheel 55 will oscillate the lever 24 so as to impart a shaking movement to the separator 16, and during each revolution of the shaft, the cam 52 will raise the tilting rod 28 so as to cause the rivets to drop into the holder 39, the burs at the same time dropping into the hopper 11. In case one holder $h$ is filled too rapidly, another holder can be brought into position to be filled by the separator. After the machine is thus set into operation, the attendant places the work in proper position on the table. Assuming that the parts are in the position represented by Fig. 12, the wheel 55, by rotating in a clockwise direction, brings the teeth 71 into mesh with the pinion 70. This rotates the shaft 69 so as to depress the punch 62 and thus pierces the work. Simultaneously with this movement, the inner end of the lever 77 enters the offset portion 84 of the cam 80 for the purpose of depressing the sleeve 63 into contact with the work as the punch is withdrawn. In the meantime, the feeding device C has permitted a bur and a rivet to drop down the feed chutes by gravity, and as the punch rod 61 is raised, the placing device E is set into operation by the ratchet mechanism operating the shaft 91, with the result that the rivet is taken from the bottom of the chute 40 and placed in position under the element 63, the latter having been raised in the meantime by the inner end of the lever riding out of the offset portion 84, Fig. 12. About the same time that the rivet is being placed, the wheel 55 has proceeded to such an extent that the teeth 118 are brought into mesh with the pinion 117 so that the bur-placing mechanism is thrown into operation, and immediately after the placing of the bur, the lever 77 enters the offset portion 85 of the cam 80 in order that the sleeve 63 may be depressed for forcing the rivet into the work and bur, after which the teeth 45 of the wheel 55 mesh with the pinion 144 and cause the rivet-cutting mechanism to trim the shank of the rivet. The sleeve 63 is held depressed against the latter by means of a locking bar 160, Fig. 1, that is mounted for reciprocatory movement in the openings 161 of the frame. This rod is actuated by any suitable mechanism and in timed relation to the movement of the sleeve 63 so that the latter will be held depressed during the up-setting operation by the hammer. For instance, the rod is actuated by a lever 62 that is oscillated by a cam wheel 163 on the shaft 53, so that the rod will be engaged over the top end of the sleeve when the latter is fully depressed and hold it in such position until the up-setting operation is finished. While the sleeve 63 is maintained in contact with the head of the rivet and after the cutters have returned to normal position, the hammer 146 is actuated by the wheel 153 for causing the rivet to be up-set. Upon the stop of the hammer, the sleeve 63 is raised by the lever 77 passing out of the offset portion 85 of the cam 80, whereupon the attendant positions the work for receiving another rivet, or places another piece of work in the machine, after which the cycle operation just described is repeated.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims.

Having thus described the invention, what I claim is:—

1. In a machine of the class described, the combination of a work table, a punch, separate members arranged concentrically around the punch and operated successively for respectively engaging the work during the withdrawal of the punch therefrom and for holding the rivets in the work during the upsetting operation, a mechanism for actuating the punch, a chute for feeding rivets or the like, and a device operated by the said mechanism for carrying a rivet from the chute to assembling position with respect to the hole punched in the work.

2. In a machine of the class described, the combination of a work table, a swinging member, means for actuating the same, a fastener-carrying element, a spring arranged to hold the element in normal position, means for throwing the element to assembling position, a locking device arranged to be automatically locked for holding said element after the same has reached assembled position, a member arranged to engage the element and move the same toward the work for inserting a fastener, and a device for releasing locking device for disengaging the element from the fastener before the latter is fully inserted.

3. In a machine of the class described, the combination of a work table, a punch, a swinging fastener-carrying element, a fastener-feeding device, means for holding the element normally in a position to receive a fastener from the device, a punch-actuating mechanism arranged to throw the element toward the work during the swinging movement thereof, a member operating on the element for inserting a fastener in the work, and a device arranged to engage the work for releasing the element from the fastener before the latter is fully inserted.

4. In a machine of the class described, the combination of a work table, a fastener-feeding device, a fastener-carrying arm, a spring operating on the arm to hold the same in position to receive a fastener from the device, a rock-shaft arranged to swing the arm to a position for inserting the fastener in the work, a lock for holding the arm in such position, a spring pressed releasing device actuated by contact with the work for opening the lock to permit the element to release the fastener before the latter is fully inserted, and a spring brought into play upon the release of the lock for quickly disengaging the arm from the fastener and returning the arm to position for receiving the next fastener.

5. In a machine of the class described, the combination of a work table, a fastener-feeding device, an element for receiving a fastener from the device, a rod mounted for rocking and longitudinal movement for carrying the said element to assembling position of the fastener, separate springs operating conjointly to return the rod to normal position, and a mechanism operating in opposition to the springs to actuate the rod for throwing the element to the position for assembling the fastener in the work.

6. In a machine of the class described, the combination of a work table, a fastener-feeding chute, a fastener-placing element, a rock shaft, a pinion thereon, an arm having teeth meshing with the pinion, means connecting the arm with the element for simultaneous movement, a member for moving the element toward the work for inserting the fastener, a locking device for holding the element in coöperative relation with the member during the insertion of the fastener, a means for releasing the locking device from the element before the fastener is fully inserted, and means arranged to operate on the rock shaft to return the element to normal position upon the releasing of the locking device.

7. In a machine of the class described, the combination of a work table, a member movable toward and away from the work table, a fastener-feeding device, a fastener-carrying element disposed normally at one side of the member and in a position to receive a fastener from the device, means for throwing the element under the member, a lock for holding the element under the member as the latter moves toward the work so as to insert the fastener in the latter, and a releaser for opening the lock at a time to permit the element to release the fastener before the latter is fully inserted in the work.

8. In a machine of the class described, the combination of a work table, a punch movable toward and away from the work table, a member associated with the punch and movable independently of and slidable thereon toward and away from the work table, a fastener-feeding device, a fastener-placing element arranged to receive a fastener from the device and to carry it under the member after the actuation of the punch, and means for actuating the member and element to insert the fastener in the work, said means being constructed to move the member twice for each stroke of the punch to engage the work while the punch is withdrawn and to engage the rivet after the same has been inserted in the work.

9. In a machine of the class described, the combination of a work table, a punching mechanism, a member movable toward and away from the table, a fastener-feeding device, a fastener-placing element arranged to receive a fastener from the device and to carry it to a point under the member, means for moving the element by the operation of the punching mechanism, and means for returning the element to normal position after insertion of the fastener in the work.

10. In a machine of the class described, the combination of a punch, means for reciprocating the punch, a fastener-feeding device, an element for carrying a fastener from the device to assembling position, mechanism between the means and element and including a ratchet device for moving the element in one direction by the said means, and means for returning the element to normal position after assembling of the fastener.

11. In a machine of the class described, the combination of a reciprocatory device, a fastener-feeding chute, a fastener-carrying element normally arranged to receive a fastener from the chute, a member for moving the element in a direction to insert the fastener in the work, a mechanism between the device and element and including a ratchet for moving the element into coöperative relation with the member, a locking device for holding the element in such relation during the insertion of the fastener, means for releasing the locking device before the fastener is fully inserted, and means for returning the element to initial position upon releasing of the locking device.

12. In a machine of the class described, the combination of a punch, means for reciprocating the punch, a slidable member surrounding and movable longitudinally on the punch, means for moving the member into engagement with the work as the punch is removed from the latter, a device for placing a fastener in position to be inserted in the hole punched in the work, and means for actuating the member for inserting the fastener in the hole.

13. In a machine of the class described, the combination of a work table, a reciprocatory punch associated with the work table, a reciprocatory device for engaging the work on the table on one stroke to assist in freeing the punch from the work and to engage the rivet and hold it in the work on another stroke, means for placing a rivet over the work at a time intermediate the strokes of the device, and an operating element for moving the punch one stroke and the said device two strokes for each rivet inserted in the work.

14. In a machine of the class described, a work table, a reciprocatory punch associated with the table, a sleeve movable longitudinally on the punch and independently thereof, a device for engaging the sleeve with the work to hold the latter on the table during the withdrawal of the punch, means for removing the sleeve from the work after the punch is withdrawn, an element for placing a rivet in line with the hole punched in the work, a second device operating the sleeve for inserting the rivet in the hole and holding the same in place during the upsetting operation, a hammer for upsetting the rivet, and means for operating the punch before the sleeve is operated.

15. In a machine of the class described, the combination of a work table, a punch, a crank and pin connection for operating the punch, a sleeve on the punch, means for moving the sleeve into engagement with the work on the table to facilitate the removal of the punch from the work, a device for feeding fasteners, a fastener placing element, a lock for releasably holding the element in position for holding a fastener in the work; automatically actuated means for releasing the lock after insertion of the fastener, and means for moving the sleeve into engagement with the fastener during the clenching thereof in the work.

16. In a machine of the class described, the combination of a work table, a punch, means for reciprocating the same, a reciprocatory member on the punch, a spring for moving the member into engagement with the work, a lever for removing the member from the work, a fastener-placing device arranged to place a fastener in line with the hole punched in the work, and means operating on the lever to permit the member to bear on the work during the removal of the punch and to subsequently insert the fastener in the work.

17. In a machine of the class described, the combination of a work table, means for placing a bur or the like under the work on the table, means for inserting a fastener in the work and bur, a pair of knives under the table for trimming the fastener and normally spaced upon it and an automatically actuated tool arranged to work between the knives and coöperating with the last-mentioned means for securing the fastener and bur together in the work.

18. In a machine of the class described, the combination of a work table provided with a slot or feed-way, a bur-feeding chute discharging into the feed-way, a placing device for moving a bur along the feed-way to assembling position, means for inserting a fastener through the work and bur and holding the fastener in position, an automatically actuated pivoted hammer for up-setting the fastener while the said means holds the latter in position, a spring connected with the hammer for moving the same during the upsetting stroke, and a notched wheel for engaging the hammer to recover the same after each upsetting stroke and to place the said spring under tension.

19. In a machine of the class described, the combination of a work table, a bur-feeding chute terminating at the table, and a horizontal reciprocatory element for placing the burs successively in an assembling position under the work on the table, said element including, a centering member in the form of a cone normally disengaged from the bur during the movement of the element, and means supported on and movable with the element for engaging the cone with the bur to center the same and disengage the cone from the bur prior to the return stroke of the element.

20. In a machine of the class described, the combination of a work table, a bur-feeding device disposed above the table, a bur-placing element for moving a bur from the feeding device to assembling position, and means movable with and secured to the said element adapted to automatically engage the bur for centering the same upon being discharged by the said element.

21. In a machine of the class described, the combination of a work table, a device for feeding burs periodically to the table, a bur-placing means for moving the burs successively to assembling position, an automatic means movable with the first mentioned means and also having independent movement after the bur placing means reaches the end of its movement for centering each bur, and means for inserting a fastener in the work and bur after the latter has been centered.

22. In a machine of the class described, the combination of a work table, means for feeding burs or the like successively by gravity to the table, a device for moving the successive burs to assembling position, and a bur-centering means carried by the said device.

23. In a machine of the class described, the combination of means for feeding burs or the like, a bur-placing device, an automatically actuated centering device arranged to engage in the opening of the bur after the latter is released by the said placing device, mechanism for moving the device in one direction to deliver a bur to assembling position, a weight for retracting the device, and means for assembling a fastener in the work and bur.

24. In a machine of the class described, the combination of a work table, a feed chute discharging from the table, a placing device including a pair of jaw members adapted to automatically open when the device is in delivering position, and a centering device movable into and out of operative position by the opening and closing of the jaw members.

25. In a machine of the class described, the combination of a bur-placing device consisting of a reciprocatory element, and a pair of jaw members thereon arranged to automatically open, and a bur-centering means movable automatically into operative position upon the opening of the jaw members.

26. In a machine of the class described, the combination of a work table provided with a way, a bur-placing device including a pair of spring-opened jaws movable in the way, means for feeding burs successively to the device when the latter is in one extreme position, and means for centering a bur upon the opening of the jaws when the device is in the other extreme position.

27. In a machine of the class described, the combination of a work table provided with a slot or way enlarged at one end, a bur-placing device movable in a slot and arranged to release the bur when delivered to the enlarged part of the slot, and a centering device arranged to engage in the opening of the bur for centering the latter upon release of the placing device.

28. In a machine of the class described, the combination of a device for placing burs or the like in assembling position, and mechanism for assembling fasteners in the burs, said device comprising a rack bar, jaw members mounted thereon and arranged to automatically release the burs when the assembling position is reached, and a pinion meshing with the rack bar for actuating the same.

29. In a machine of the class described, the combination of a device for placing burs or the like in assembling position, and including a rack bar, a pinion meshing with the rack bar, means intermittently brought into operative relation with the pinion for moving the latter in one direction, and means connected with the rack bar for returning the latter to initial position.

30. In a machine of the class described, the combination of a device for placing burs or the like in assembling position, said device including a reciprocatory element, a rack bar for moving the element in one direction, a pinion meshing therewith and arranged to run free during the return movement of the bar and a weighted cord and pulley device connected with the bar for retracting the element.

31. In a machine of the class described, the combination of a device for placing burs or the like in assembling position, said device including a pair of bur-engaging jaws, a bur-centering device, a spring supporting the same, and means carried by the spring for moving the centering device into and out of operative position by the opening and closing of the said jaws.

32. In a machine of the class described, the combination of a work table provided with a slot or way, bur-engaging jaws movable in the way, a reciprocatory element supporting the jaws, a spring secured the element and having its free end arranged under the jaws, a centering device on the said free end of the spring, and a cam on the spring arranged to engage between the jaws to raise the centering device as the jaws open and to lower the same when the jaws close.

33. In a machine of the class described, the combination of a mechanism for assembling a fastener in the work, a pair of nipper jaws simultaneously movable toward each other for automatically removing the superfluous material of the fastener, said jaw being normally separated, a reciprocatory bur-centering device including an element movable to and from a position between the cutters and in a direction transverse to the direction of reciprocation of the device for placing the bur in a position to receive the fastener.

34. In a machine of the class described, the combination of a rivet-assembling mechanism, a pair of cutters for trimming the shanks of the rivets after the latter are assembled in the work, means for holding the jaws open during the assembling of the rivets, and means for closing the jaws for the trimming operation.

35. In a machine of the class described, the combination of a work table, means for applying burs to the work on the table, means for applying fasteners to the work and burs, cutters arranged to trim the fasteners, a yielding device for holding the cutters in open position, a wedge for periodically closing the cutters in position to the said device, and a tool arranged to operate on the fasteners after the latter are trimmed for securing the burs and fasteners together.

36. In a machine of the class described, the combination of a work table, a rivet-assembling mechanism, a bur-assembling mechanism, cutters for trimming the shanks of the rivets, a wedge operating on the cutters for the trimming operation, and means for retracting the wedge to permit the cutters to move to open position.

37. In a machine of the class described, the combination of a work table, a member for holding a fastener in the work, a cutting device consisting of a pair of cutters normally spaced apart, means for moving the cutters toward each other for trimming the fastener in the work, and a hammer working between the cutters when the latter are in open position for up-setting the fastener.

38. In a machine of the class described, the combination of a work table, a punch, means for operating the punch, a bur-placing device for applying a bur to the work after the punching operation, an automatically operated centering device for engaging in the opening of the bur after the latter has been released by the said placing device, a rivet-placing device for inserting a rivet in the work subsequently to the placing of the bur, a cutting device for trimming the rivet after the latter is inserted in the work, and an automatically-actuated hammer for up-setting the rivet subsequently to the trimming operation.

39. In a machine of the class described, the combination of a work table, a punch, a sleeve movable into contact with the work, a bur-placing device, a rivet-placing device for inserting a rivet in the work subsequently to the placing of the bur, an automatically-actuated hammer for up-setting the rivet, and means for locking the sleeve in contact with the work during the up-setting operation.

In testimony whereof I affix my signature in presence of two witnesses.

WALTER BAKER.

Witnesses:
HARRY JONES,
EUGENE CHRISLER.